Nov. 10, 1970  K. E. BRONSON  3,538,608
GROUND SETTLEMENT INDICATING APPARATUS
Filed Nov. 1, 1967
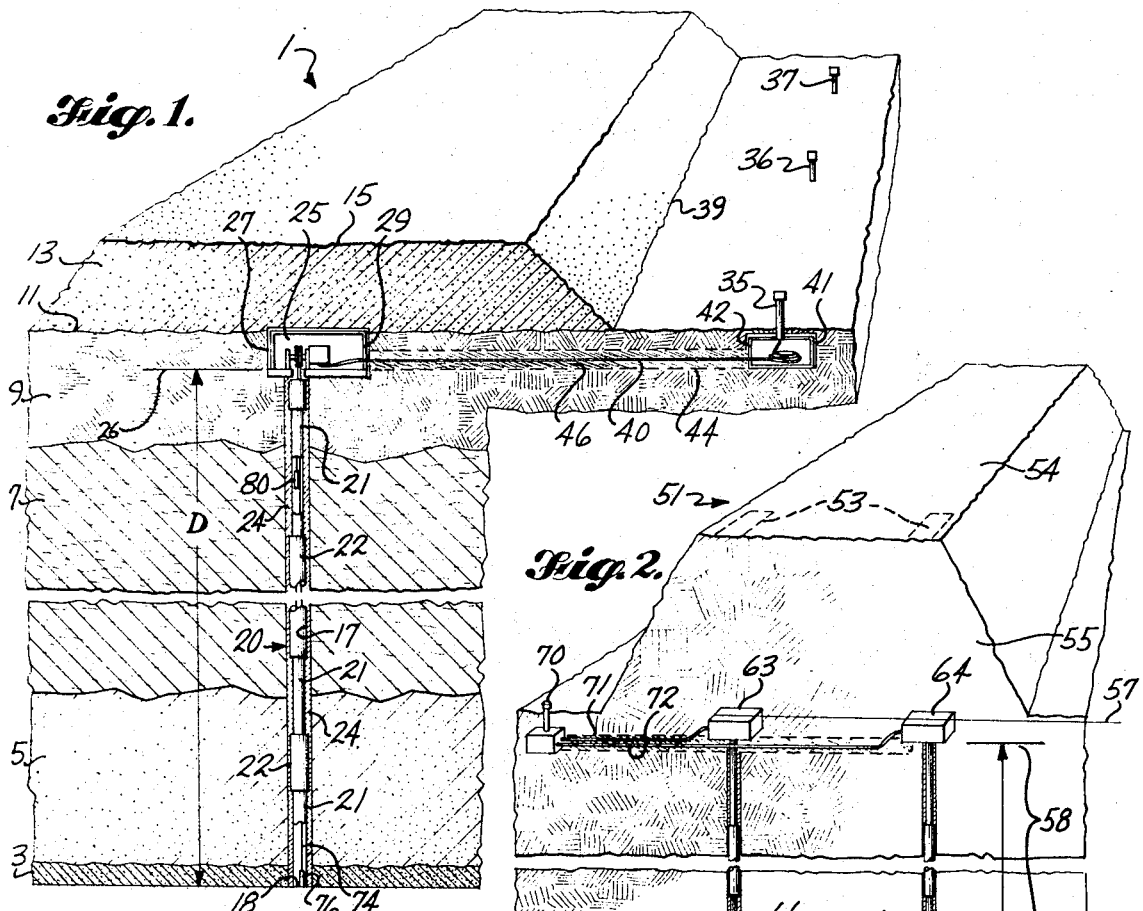
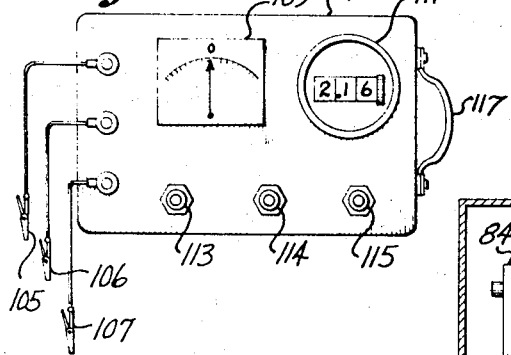
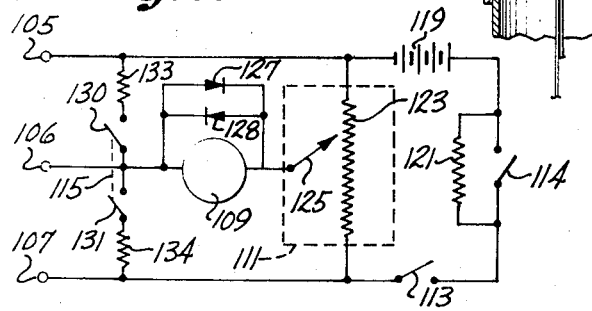
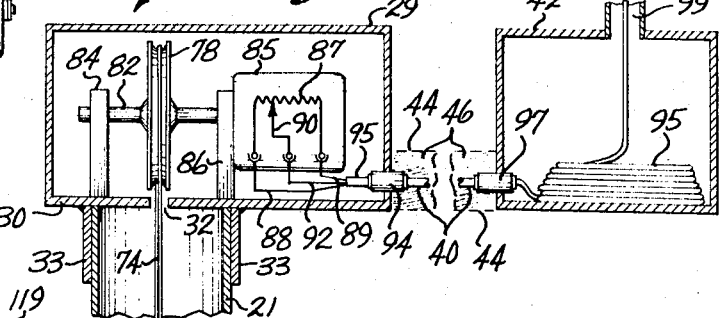
INVENTOR
KENNETH E. BRONSON
BY
Christensen, Sanborn
& Matthews
ATTORNEYS United States Patent Office 3,538,608
Patented Nov. 10, 1970

3,538,608
GROUND SETTLEMENT INDICATING
APPARATUS
Kenneth E. Bronson, 116 NW. 176th Place,
Seattle, Wash. 98177
Filed Nov. 1, 1967, Ser. No. 679,852
Int. Cl. G01b 3/12, 5/30
U.S. Cl. 33—134                                    2 Claims

ABSTRACT OF THE DISCLOSURE

To measure the vertical deflection of a body of material with respect to a stable point on the ground on which the material is supported, one end portion of a flexible cable is anchored to the stable point and the cable is extended upwardly through a telescopic tube and over a wheel freely journaled in a bearing secured to the body on a horizontal axis above the stable point. A tautening weight is applied to the cable so that the cable causes rotation of the wheel as the bearing undergoes deflection with the body. From the wheel and bearing chamber, which may be buried beneath top soil or roadway material, an extensible motion transmission cable leads through a trench with straw slip-packing to an accessible station where a portable monitoring unit may be plugged in to read out the vertical deflection.

BACKGROUND OF THE INVENTION

Field of the invention

This invention relates to an apparatus for accurately measuring the vertical deflection of a body of material, such as the settlement of the ground and particularly to such an apparatus which permits ground settlement measurements to be indicated remotely so that the measuring does not interfere with activities in the area above the ground subject to settlement.

Description of the prior art

The general field of soil mechanics has been making continuous strides in recent years in developing technology permitting the use of land for highway and construction sites which previously were avoided for such uses due to the nature of the water table or other physical characteristics of the soil that made construction of such structures quite undesirable. However, the need for utilization of all available land near and around urban and other population centers has created the need for developing methods which permit the use of a greater portion of the land for highway and other structural installations above it. One of the major drawbacks of the use of such property is its tendency to settle under the imposed weights of the highway or other structure being constructed upon it. In some cases the rate of settlement is quite slow but in many cases its overall effect is to dislocate and often cause excessive stresses which limit the life or even destroy the usefulness of the structure.

Thronugh well known techniques of soil sampling, it is possible to predict the tendency of particular soil structures to subside or settle, and from this information it is possible to develop a series of settlement curves for different amounts of weight loading over different periods of time which would cause the settlement to occur. However accurate the soil samples might be along with their analysis, they cannot be completely relied upon since the structure of the soil might vary so drastically between sampling points that the settlement of the overall area might be substantially different from that indicated by the analysis of the samples taken. Since most projects of this nature are on a relatively tight time schedule, the cost of delays in completion to a project due to an unexpected requirement for more time to allow for settlement can be and often is quite significant. For this reason various methods and apparatus have been devised for monitoring the actual settlement that occurs at a construction site.

Some of these methods include the basic surveying monitor which requires a setting up of a level and taking of elevation readings at various points along the construction site where settlement is being monitored. This, of course, requires the use of the surveying equipment and crew, and their activity often interferes with the free passage of road grading equipment and other construction activities.

Another recently developed technique includes boring a hole from the original ground surface down to a suitable depth where the ground structure is stable, such as provided by a rock outcropping or compacted sand layer. The hole is then used as a chamber for housing a telescopically collapsible length of tubing made up of sections which are relatively slidable to accommodate settlement of soil layers along its length which have greater or lesser amounts of compaction. The tube extends up through the ground surface so that a workman can drop a measuring tape, line, or other suitable means, down the tube periodically to measure the distance from the ground surface to the stable layer at the bottom of the tube. This technique is generally accurate, but has some disadvantages. The primary disadvantage is the fact that the tube itself extends up from the ground surface and is often broken or otherwise interferes with the construction activities on the surface. Once the construction work has reached the point that a roadbed or building floor is to be placed in the area where the tube extends through the surface, a protective casing with an access cap must be installed if further settlement readings are to be taken at this point. Such a casing is expensive both in structure and space requirements and the provision of a clear access for taking such readings is bothersome. It is therefore the principal object of the instant invention to provide an apparatus for accurately measuring the amount of ground settlement in a construction site in a manner which permits the continuation of grading and other construction activities above the settlement area without interference from the measuring system.

Another object of the instant invention is to provide an improved settlement measuring apparatus which utilizes measuring means which can be continually or periodically monitored without interfering with the activities on the surface of the settlement area.

A still further object of the instant invention is to provide a ground settlement measuring apparatus which permits non-interfering measurement of ground settlement even after the surface area over the settlement area has been constructed upon.

Another object of the instant invention is to provide a ground settlement measuring apparatus which permits the remote monitoring in one location of a series of measuring devices placed at different locations in the construction site.

A still further object of the instant invention is to provide a reliable inexpensively constructed ground settlement measuring apparatus from which readings may be obtained by any inspector directly in units of distance with a minimum of instruction.

SUMMARY OF THE INVENTION

The present invention relates to a generally improved apparatus for measuring the vertical deflection of a body of material, such as the settlement of the ground, and is particularly useful for measuring ground settlement in a construction site where additional work is to be done at the site during the settlement period. According to the invention, a vertical hole is formed at the site to connect a datum point at the bottom where settlement is not likely to be signficnat, to an initial measuring point at the top of the hole. The ground separating the two points is of a nature which makes settlement between the initial and datum point likely to be significant. A telescopically collapsible tube is placed in the hole to span its length and to contain a weight supported on the datum point. The weight is connected to one end of a flexible cable, cord, or the like suspended about a pulley, which is freely journalled in or on a journal bearing at the initial point, with the cord supporting at its other end a counterweight suspended within the tube. The pulley is supported by and turns with a shaft which also turns a potentiometer. The weighted cord causes the pulley to rotate whenever and to the same extent that the initial point moves toward or away from the datum point due to settlement or rebound of the ground separating the initial point from the datum point. If the surface area around the initial point is needed for a roadway or is to be covered with material which will accelerate the settlement between the initial point and the datum point, the pulley and potentiometer may be placed in a suitable housing and buried. A transmission cable is connected to the potentiometer and extended to an out-of-the-way spot where a monitoring unit can be connected to the cable to indicate in terms of length units the resistance of the potentiometer. The monitor may include a balancing circuit and a second potentiometer connected to a dial counter so that the resistance of the second potentiometer is balanced to equal the resistance in the measuring device potentiometer and this value is directly readable on the counter in units of distance of settlement. This is to say, the monitor operates to correlate the angular deflection of the pulley from a preset starting point thereon, with respect to predetermined increments of vertical deflection of the ground, so as to indicate the deflection of the ground.

These and other features and advantages of the invention will become more fully apparent from the following detailed description thereof, which is to be read with reference to the accompanying drawings.

BRIEF DESCRIPTION OF THE DRAWINGS

In the drawings:

FIG. 1 is a combination end section and perspective view of a ground settlement area, such as a roadway, utilizing the settlement measuring apparatus of the instant invention;

FIG. 2 is an end section of a bridge end support area utilizing the apparatus of the instant invention for remotely indicating the ground settlement below the bridge end;

FIG. 3 is a side elevational view of a typical apparatus constructed in accordance with the instant invention for measuring settlement;

FIG. 4 is a top plan view of a monitoring unit suitable for use in the instant invention; and FIG. 5 is a schematic illustration of an electrical circuit for a monitoring unit useful in the instant invention.

DESCRIPTION OF THE PREFERRED EMBODIMENTS

For a more detailed understanding of the instant invention, reference is now had to FIG. 1 which illustrates a ground settlement area 1 as it is typically prepared prior to the fabrication of a building or the continuation of preparation of a roadway. As shown in the section representation of the earth structure beneath the ground settlement area 1, there is a stable layer 3 which for all practical purposes will not subside in an amount significant enough to affect the usefulness of the surface area. Above this stable area 3 there may be loose sand 5 which will become more compacted when subjected to additional weight and thereby cause settlement. In some areas, and as shown, there is a layer of peat 7 which becomes easily compacted as additional weight is imposed upon it. In a typical area, topsoil 9 will be found adjacent to the initial surface layer 11.

Depending upon the plans for utilization and the test results of soil samples representing the structure of the earth beneath the surface level 11, it may be necessary to add to the surface level an overburden of compacted material 13. Additional weight caused by overburden 13 will accelerate the settlement of the material separating the surface level 11 and the stable layer 3. If additional acceleration is required to meet construction schedules, the height of overburden 13 may be increased. In the case of some construction sites for buildings where heavy weights are anticipated within the building, a large overburden will be placed on the site several months before the actual construction of the building to accelerate the settlement and stabilize the subsidence prior to the addition of any of the structure of the building to the site. The top surface of the overburden 13 is referred to as the grade surface 15.

In order that the settlement in the construction area 1 can be measured and monitored, a vertical hole 17 is drilled through the various levels of material until a stable material is found, such as stable layer 3. At this point a reference data point 18 is established within the stable layer 3. Telescopically collapsible tube 20 is placed in the vertical hole 17 and backfill material 24 is used to span the space between the tube 20 and the sides of the vertical hole 17. Tube 20 includes tube sections 21 which span between and are slidable within slip collars 22 to accommodate the various amounts of settlement occurring in the different layers of the earth. While part of the weight of tube 20 is supported by the stable layer 3 at the reference data point 18, skin friction between the backfill 24 and the external surface of the tube sections 21 helps to support the tube 20 and thereby avoids movement and compaction of the reference data point 18 in the stable layer 3.

With continued reference to FIG. 1, there is seen that a measuring device 25 is positioned within a measuring chamber 27 dug out of the topsoil adjacent to the initial surface layer 11 at the top of tube 20 to establish a second reference point 26 at the top of the collapsible tube 20. The overall settlemen* is indicated by the change in the distance "D" between the first reference datum point 18 and the second reference point 26 over a period of time. The measuring device 25 is placed within a housing 29 which is of approximately the same size as chamber 27 and has sufficient structural rigidity to resist the forces applied by the soil around it and the overburden 13 above it.

In order that the settlement readings may be taken without interfering with construction activity on the settlement area, housing 29 and the measuring device 25 are of a nature that permits the physical burying of the equipment above the hole 17 so that trucks and other equipment can pass over the area without breaking or otherwise interfering with the settlement measuring equipment. With this type of construction, the ground settlement area may have several measuring devices placed along and around the area in as many locations as it is considered necessary for adequately monitoring the settlement of the ground beneath the construction site. In some locations the settlement information is so critical that measuring devices will be placed within twenty or thirty feet of each other. In more typical installations the measuring devices will be placed along a roadway construction site from two hundred to eight hundred feet apart. In any event, the devices are out of the way.

In order that the indications of the changes in distance D can be recorded, remote monitoring stations 35, 36 and 37 are positioned along the construction site in remote locations which will not interfere with the building activity at the site. As shown in FIG. 1, overburden 13 is laid along the settlement area 1 with its toe line 39 positioned clear of the upstanding remote monitoring stations 35, 36 and 37. The signal generated by the measuring device 25 is transmitted to the remote monitoring station 35 through a transmission cable 40 which connects the measuring device housing 29 with a similar monitoring housing 42 which is positioned in a monitoring chamber 41 in the area close to the surface 11. The transmission cable 40 is placed in a trench 44 which may include a slip-packing 46, such as straw, permitting easy pulling of the transmission cable 40 out of the storage loops in the monitoring housing 42 through the connector trench 44 as the housing 29 settles.

In operation when the measuring apparatus 25 is placed, as shown in FIG. 1, it measures the change in the distance D between the device 25 and the reference datum point 18, and thus the vertical deflection of device 25 with respect to point 18. This measurement is produced as a signal which is transmitted through the transmission cable 40 to the remote monitoring station 35 to be periodically checked by operating personnel to keep track of the amount of settlement at the particular settlement point being measured. These and similar readings can be taken at the other monitoring stations 36, 37 and all around the settlement area 1 until the readings indicate that the settlement has been reduced to a tolerable rate which will permit continued construction. If after the building has been fabricated on the site, or the roadway has been placed over the settlement area, it is considered prudent to continue monitoring the amount of settlement in the area, this can be easily done since the measuring device and tube are normally left in place.

Another example of the use of the measurement apparatus in the instant invention is that shown in FIG. 2 wherein a bridge end foundation site 51 is shown including piling positions 53 which have been selected as the points for supporting one end of a bridge spanning from the upper grade level 54 across the lower grade level 57. As shown, the upper grade level 54 is separated from the lower grade level 57 by a compacted fill material 55. Soil samples may indicate that the soil 58 separating the lower grade level 57 from a relatively stable level 60 is of an unconsolidated nature and will settle due to the presence of the compacted fill 55. If the bridge were constructed immediately, settlement of soil 58 might cause additional stresses on the structure which would possibly result in failure, or at least in misalignment of the pilings with the bridge supports. For this reason the rate and extent of settlement of the piling positions 53 is monitored by placing measuring devices 63 and 64 someplace beneath the piling positions 53 and above the majority of the consolidated soil 58. As in the installation shown in FIG. 1, the measuring devices 63, 64 are positioned at the top of telescopically collapsible tubes 66 and 67 connecting the measuring devices with the stable layer 60. Since the measuring devices 63 and 64 are relatively close to one another, a single remote monitoring station 70 is used for indicating the measurements transmitted by the measuring devices 63 and 64 through transmission cables 71 and 72 spanning between measuring devices 63 and 64 and remote monitoring station 70.

With reference to FIG. 3, a more detailed description of a preferred embodiment of the measuring device 25 is made. As shown, the housing 29 includes a bottom member 30 which defines a cable aperture 32 connecting the inside of the housing with the inside of the upper tube section 21. For alignment purposes, a collar member 33 is formed in the bottom side of the bottom member 30 to fit over the top edge of the upper tube section 21. The measuring device 25 utilizes a weight-supporting cable 74 extending down through the aperture 32 into the tube 21 to support main weight 76 at the bottom of the tube at reference data point 18, as shown in FIG. 1. The cord or cable 74 is suspended from a measuring pulley 78 which is positioned for rotation within the housing 29. The other end of cable 74 also extends through the aperture 32 to support counterweight 80 which is also positioned within tube 21. Pulley 78 is supported for rotational movement with a shaft 82 which is supported at one end in a suitable bearing support 84. The other end of shaft 82 is part of a potentiometer 85 which is also supported within the housing 29 by suitable frame member 86.

As the distance D is reduced due to the settlement between the measuring device 25 and the datum reference point 18, counterweight 80 moves downwardly causing the pulley 78 and the supporting shaft 82 to rotate. This rotation changes the resistance of the potentiometer, which is schematically shown at 87 with an electric potential placed on the potentiometer by means of electric leads 88 and 89. The particular position of the shaft 82 is electrically represented by the variable contact 90 which is connected to an electrical lead 92.

As shown in FIG. 3, housing 29 also includes a cable inlet aperture 94 for permitting the cable 40, including the three leads 88, 89 and 92, to pass through the housing 29. As shown in FIG. 1, the cable 40 is laid in a suitable ditch 44 which may include a packing material 46 which permits the relative movement of the cable 95 through the ditch. One such suitable material has been found to be straw. At the other end of the trench 44 there is located a monitoring housing 42 which includes a cable outlet tube 97 permitting the main cable 40 to exit from housing 42. As shown, cable 40 may be looped in a pile 95 in the bottom of housing 42 so that as the housing 29 subsides, cable 40 may be drawn through straw 46 and pulled from the supply 95 in housing 42. The other end of cable 40 exits through the top portion 99 of the housing 42 which supports the remote monitoring post 100, where it is noted that there are positioned contacts for electrical leads 88, 89 and 92.

To obtain the transmitted resistance signal from the measuring device 25, a monitoring unit 103 has been developed, as shown in FIG. 4. Monitor 103 may be permanently installed on the monitoring post 100 or it can be carried by handle 117 from one monitoring station to another as the individual readings are taken. Monitor 103 includes spring clip connectors 105, 106 and 107 which may be used to connect the monitor 103 with the contacts 88, 89 and 92 on monitoring post 100. On the face of the monitor 103 there is positioned a balancing meter 109 and a direct reading mechanical counter 111 which may be calibrated to present a numerical indication of the change in distance between the measuring device 25 and the datum reference point 18 in units of feet. Also on the face of the monitor 103 are a coarse adjustment button 113, a fine adjustment button 14, and the internal test button 115.

For an explanation of the electrical operation of monitor 103, reference is now directed to FIG. 5 which includes an electrical diagram representation of the electrical components included in the monitor 103. As shown, the circuit for the monitor 103 includes a suitable power source such as battery 119 and coarse adjustment resistor 121. Also included are potentiometer 123 and variable contact 125, which has a movement directly connected with mechanical counter 111. Balancing meter 109 is protected by diodes 127 and 128. Test button 115 operates test switches 130 and 131 which make connection with the precision test resistors 133 and 134.

In operation, pulley 78 is turned through the change in position of the counterweight 80 due to the change in the distance D. Shaft 82 causes the variable contact 90 of potentiometer 85 to move along the resistance 87 thereby producing a signal corresponding to the amount of rotation of the pulley 78 which, of course, is proportional to the amount of change in the distance D. This signal is then transmitted through the cable 40 to the contacts 88, 89, 92 on the monitoring post 100. When a reading of the change in distance is desired, the monitor 103 is connected through its contacts 105, 106 and 107 to the electrical leads 88, 89 and 92. When the coarse adjustment button 113 is depressed it makes contact within the monitor 103 so that the current flows from the battery 119 through the coarse adjustment resistor 121. At this time the input shaft of mechanical counter 111 is rotated moving the variable contact 125 along the ptoentiometer 123 until the balancing meter 109 indicates a center or balancing point. While the coarse adjustment button is still depressed, the fine adjustment button 114 is then depressed closing the switch 114 so that current now passes directly without going through the coarse adjustment resistor 121. Again, the input shaft of counter 111 is turned to change the position of variable contact 125 along potentiometer 123 until the balancing meter 109 indicates a balance position. At this point the dial indication on counter 111 corresponds exactly with the resistance of the potentiometer 85 and then a reading can be taken which indicates the change in the distance D.

For example, where feet is the desired unit of measurement pulley 78 has been made to have a circumference exactly equal to one foot. Potentiometers 85 and 123 have been selected with a range of a thousand ohms. In addition, potentiometer 85 has a gear reduction of 10 to 1. Therefore, for each complete revolution of the pulley 78 and its supporting shaft 82, potentiometer contact 90 moves along resistor 87 to a position equal to a resistance of one hundred ohms. With these components available, the vertical hole 17 is formed and the tubes 21 placed in the hole with the weights 76 and 80 suspended from the cable 74 over the pulley 78 until weight 76 rests upon point 18. Next, pulley 78 is rotated without affecting the position of weights 76, 80, by slipping the cable 74, until the reading on the counter 111 is at its one hundred mark, with meter 109 indicating a balance of resistance between potentiometers 85 and 123. Cable 74 is then rested upon the pulley 78 so that as it rotates due to the change in distance D, the change in the resistance in the potentiometer 85 is measured. The reason that the counter 111 is positioned at one hundred rather than at the zero point is that some initial inaccuracies have been experienced in the range below one hundred which are not present above one hundred. Thus, for every one hundred ohms of resistance change in potentiometer 85, there is an accurate representation of a change of settlement of one foot by the dial of counter 111. Recent tests have indicated that an installation using this selection of sizes of components will produce a measuring accuracy where the tolerance is no more than 0.004 feet.

It is therefore seen that a very accurate, yet simple and reliable technique has been developed for remotely measuring earth settlement. With this installation it is possible to continue taking settlement readings even after the structure has been completed, since the measuring devices can be buried permanently beneath the structure with the readings being taken from a remote point. The cost of the installation has been kept low by utilizing one monitoring unit which can be used to obtain the reading at several monitoring stations. Further there is little chance for error in taking of the readings because the reading is available directly in units of distance.

I claim:

1. A means for indicating the change in distance between a first reference point in the earth and a second point separated from said first point by material subject to consolidation comprising:
   telescopically collapsibe tube means extending between said first and second points;
   a measuring device housing positioned to receive one end of said tube and containing said second point;
   measuring means positioned within said housing including cord means spanning within said tube means and between said first and second points and other means responsive to a change in length of said cord means spanning between said first and second points to generate a signal proportional to said change;
   monitoring means positioned laterally of said measuring means and including indicator means responsive to said generated signal to display a readable indication of the quantity of said signal;
   signal transmission means connected between said measuring unit and said monitoring means to transmit said signal to said indicator means from said measuring means; and
   trench means connecting said housing with said monitoring means and including slip-packing material through which said signal transmission means passes.

2. The apparatus of claim 1 wherein: said sli-packing material is straw.

References Cited

UNITED STATES PATENTS

| | | | |
|---|---|---|---|
| 399,676 | 3/1889 | Leuner | 33—125 |
| 1,625,976 | 4/1927 | Bechtel | 33—126 |
| 3,327,396 | 6/1967 | Waddell | 33—125 |
| 2,166,212 | 7/1939 | Hayward | 33—134 |
| 3,140,609 | 7/1964 | Mayes | 33—126.6 X |
| 2,659,151 | 11/1953 | Lee | 33—125 |
| 3,276,123 | 10/1966 | Huggenberger | 33—1 |
| 3,404,460 | 10/1968 | Livingston et al. | 33—125 |

FOREIGN PATENTS

| | | |
|---|---|---|
| 1,088,196 | 9/1954 | France. |
| 124,175 | 10/1901 | Germany. |
| 578,283 | 7/1958 | Italy. |
| 185,501 | 3/1967 | U.S.S.R. |

ROBERT B. HULL, Primary Examiner

U.S. Cl. X.R.

33—1, 125